United States Patent [19]

Yoshimi

[11] Patent Number: 5,416,528
[45] Date of Patent: May 16, 1995

[54] TELEVISION RECEIVER

[75] Inventor: Osamu Yoshimi, Mishima, Japan

[73] Assignee: Matsushita Electric Industrial Co., Ltd., Osaka, Japan

[21] Appl. No.: 226,112

[22] Filed: Apr. 11, 1994

Related U.S. Application Data

[63] Continuation of Ser. No. 972,718, Nov. 6, 1992, abandoned, which is a continuation of Ser. No. 706,571, Mar. 28, 1991, abandoned.

[30] Foreign Application Priority Data

May 25, 1990 [JP] Japan .................. 2-136301

[51] Int. Cl.6 ........................................... H04N 5/455
[52] U.S. Cl. ...................... 348/569; 348/564; 348/563
[58] Field of Search .................. 348/569, 564, 563

[56]       References Cited
U.S. PATENT DOCUMENTS

| 4,270,145 | 5/1981 | Farina ................... 358/188 |
| 4,626,892 | 12/1986 | Nortrup et al. ........... 358/21 R |
| 4,989,081 | 6/1991 | Miyagawa et al. ......... 358/183 |
| 5,212,553 | 5/1993 | Maruoka ................... 348/563 |

FOREIGN PATENT DOCUMENTS

2920023A1 11/1979 Germany.
2939589A1 4/1981 Germany.
4354280 12/1992 Japan ................. H04N 5/46

Primary Examiner—Curtis Kuntz
Assistant Examiner—Minsun Oh
Attorney, Agent, or Firm—Wenderoth, Lind & Ponack

[57] ABSTRACT

A television receiver is manufactured with one microcomputer which is commonly used in many types of television receivers by an initial setting operation for type switching use, and is adapted to program a type switch setting portion corresponding to the type or data corresponding to it so as to specify a function to be carried out in a microcomputer and is adapted to use the microcomputer so as to effect a receiving operation, and is provided with an on screen arrangement for displaying on its television screen face the programmed contents of the type switch setting portion when the inspecting instructions have been detected.

1 Claim, 5 Drawing Sheets

TELEVISION RECEIVER

This application is a continuation of now abandoned application Ser. No. 07/972,718, filed Nov. 6, 1992, which is in turn, a continuation of now abandoned application Ser. No. 07/706,571, filed Mar. 28, 1991.

BACKGROUND OF THE INVENTION

The present invention generally relates to a television receiver to be manufactured with one microcomputer being commonly used in many types of television receivers by the initial setting operation for type switching use.

In recent years, television receivers using a microcomputer have been manufactured in larger numbers with each circuit block for composing a television receiver being controlled by the microcomputer. In order to meet the various market demands, many types of receivers are manufactured with the microcomputers for control use to be used for each of the various types being respectively different.

When the microcomputers are used in accordance with the respective types so as to manufacture many types of television receivers, the management becomes complicated, and also, the development efficiency is reduced. It is generally carried out that the inputs as to what functions to be effected are given to a microcomputer so as to use the same microcomputer for many types.

The construction example of the conventional television receiver is shown hereinafter in FIG. 1 so as to illustrate the operation thereof and a function inspection at the manufacturing time. FIG. 1 is a block diagram of a television receiver which is provided with a microcomputer 1 for operating the respective functions. The input portion of the above described microcomputer 1 is provided with a type switch setting portion 2, a remote control apparatus 3 (hereinafter referred to as remote control) for operating the television receiver, a keyboard 4 for effecting the same functions as those of the above described remote control 3, and so on. A circuit of an on screen means 7a for channel display use for displaying the reception channel, a television receiving circuit 5, a switching means 8 for switching the signals from the above described television receiving circuit 5 and the signals from the on screen means 7a for channel display use, a CRT 6 for displaying the pictures, and so on are connected with the output portion of the microcomputer 1.

In order to manufacture many types of television receivers having the same microcomputer 1, a type as an object or data in accordance with it is inputted into the type switch setting portion 2 so as to specify in registration the function to be carried out. When the television receiver having such construction is manufactured and used, a programming of the microcomputer 1 is carried out so that only a function corresponding to the specified type may be operated at least when the power supply is on.

In order to confirm whether or not the set contents of the type switch setting portion 2 are set by mistake because of component insertion errors, wiring errors on the print wiring basic plate and so on in the manufacturing step of such conventional television receiver, the bothersome operation of confirming whether the function is normal or not is forced to be effected by the actual operation in each function of the television receiver.

SUMMARY OF THE INVENTION

Accordingly, the present invention has been developed with a view to substantially eliminating the above discussed drawbacks inherent in the prior art, and has for its essential object to provide an improved television receiver.

Another important object of the present invention is to provide an improved television receiver which is capable of quickly checking whether or not the set contents of the receiver type switch setting portion 2 is correct if each function is not actually effected.

In accomplishing these and other objects, according to one preferred embodiment of the present invention, there is provided a television receiver which is adapted to set in the type switch setting portion a type or the data corresponding to it so as to specify a function to be carried out into a microcomputer and adapted to use the microcomputer so as to effect the receiving operation, and is provided with an on screen means for displaying on the television screen face the setting contents of the above described type switch setting portion when the inspecting instructions have been detected.

According to the construction, on the side of the television receiver which has detected the inspection instructions when the inspection instructions are inputted, the set contents the microcomputer have read from the type switch setting portion are displayed on the television screen face by the on screen means. Therefore, it is possible to check whether or not the actual set contents are right by the judgment as to whether or not the display contents are right.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
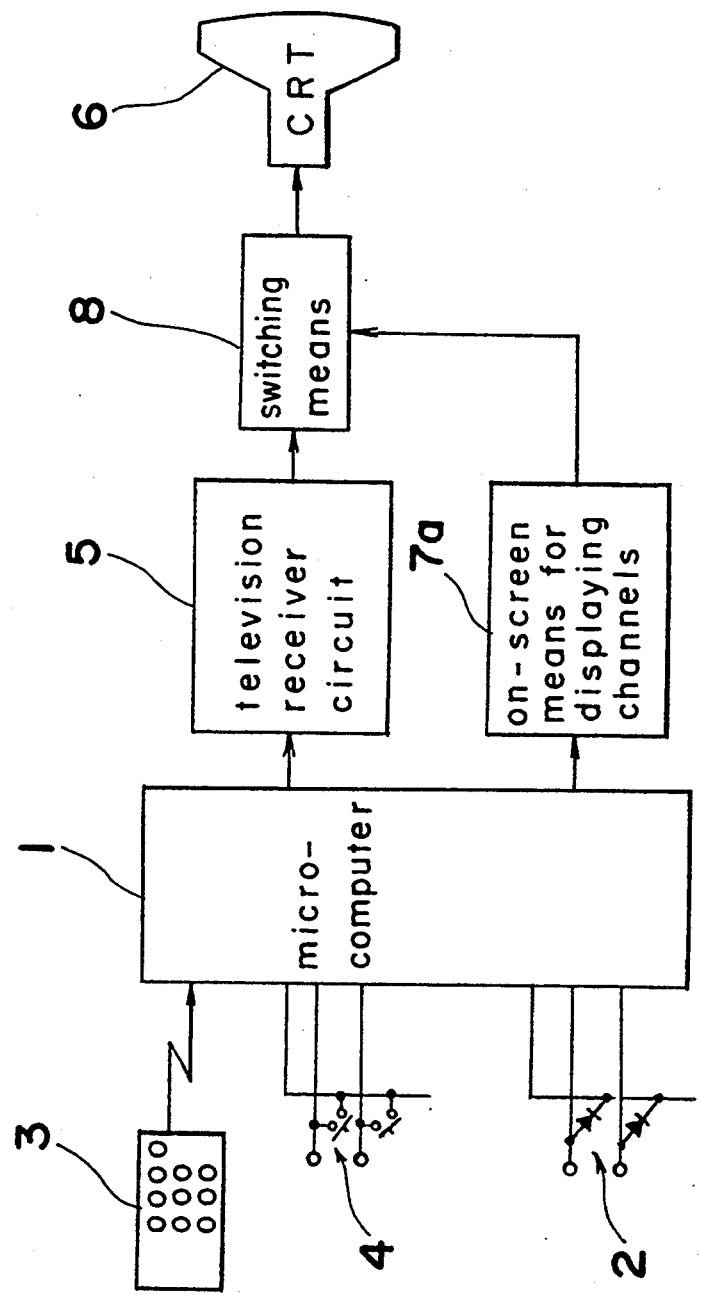
FIG. 1 is a block diagram of the conventional television receiver.

Before the description of the present invention proceeds, it is to be noted that like parts are designated by like reference numerals throughout the accompanying drawings.

The present invention is a television receiver where the respective types of functions such as station selecting operation or the like are adapted to be automatically controlled in accordance with the data predetermined by the microcomputer. It can be confirmed at a glance by the on screen display of the set contents without checking through the actual operation of the television receiver by the various checking machines whether or not the data established in accordance with the type is properly set.

The setting operation of the data corresponding to each type is effected by the circuit print wired in hardware with respect to the data setting memory (RAM) of the microcomputer. When it has been connected to a 5 volt DC power supply from the on/off wiring of the voltage application of 5 volts DC with respect to the BS terminal, the BS tuner/existing is shown with respect to the existing/absence of, for example, the BS tuner. When the input voltage into the BS terminal is 0 V without any application of the 5 volts DC, the BS tuner/none is shown. The existence/none of the BS is data set in terms of hardware with respect to the memory of the microcomputer through the wiring pattern by whether or not the BS terminal is connected to the 5 volts DC power supply.

In order to check whether the data which were set by wiring with respect to the memory (RAM) of the microcomputer in terms of hardware in accordance with each type in this manner are correctly set in accordance with the type, there are considered methods of (1) checking the wiring patterns in terms of hardware,
(2) checking by the actual operation of the television receiver,
(3) checking by the on screen displaying of the set data in accordance with the title, and so on.

Conventionally, the checking methods of the above described (1) and (2) are effected. Namely, the patterns wired in terms of hardware are visually checked for it is automatically checked by an exclusive apparatus whether or not they agree with the correct patterns by the image processing. Or by the actual operation of the television receiver, a check is made as to whether or not the controlling by the set data is correctly effected in accordance with the functions provided in the type.

In the visual check of the wiring patterns, errors are likely to be caused when the patterns become complicated, thus resulting in worse production efficiency. The confirming checks are made by the method of automatically checking the image processed wiring patterns by an exclusive inspecting machine or the method of actually getting the television receiver to operate and inputting the necessary signals from the exclusive transmitter. The checking method which requires facilities such as exclusive automatic inspecting apparatuses, transmitter and so on is suitable for a step of manufacturing one type in large quantities. But it is difficult to correspond the small quantity production into many different types one after another as in multitype small quantity production. Also, as many exclusive automatic inspecting apparatuses are required even with respect to the overseas plant expansion, preparations are hard to effect in terms of facilities, and many production engineers skilled in the facilities are also required. Therefore, it is difficult to deploy many types.

The invention of the present application is adapted to provide the television receiver with a self-check function by the method of the above described (3). Special exclusive inspecting apparatuses and so on are not required even in the multitype small quantity production, and the abroad deployment. The complicated wiring patterns themselves are not required to be visually checked. All they have to do is to confirm the existing/none of the set functions in accordance with the title of the on screen display. Therefore, the above described method of (3) is a preferred method of better productivity.

Embodiment

The present invention will be described hereinafter in one embodiment with reference to the drawings.

Figure 2:
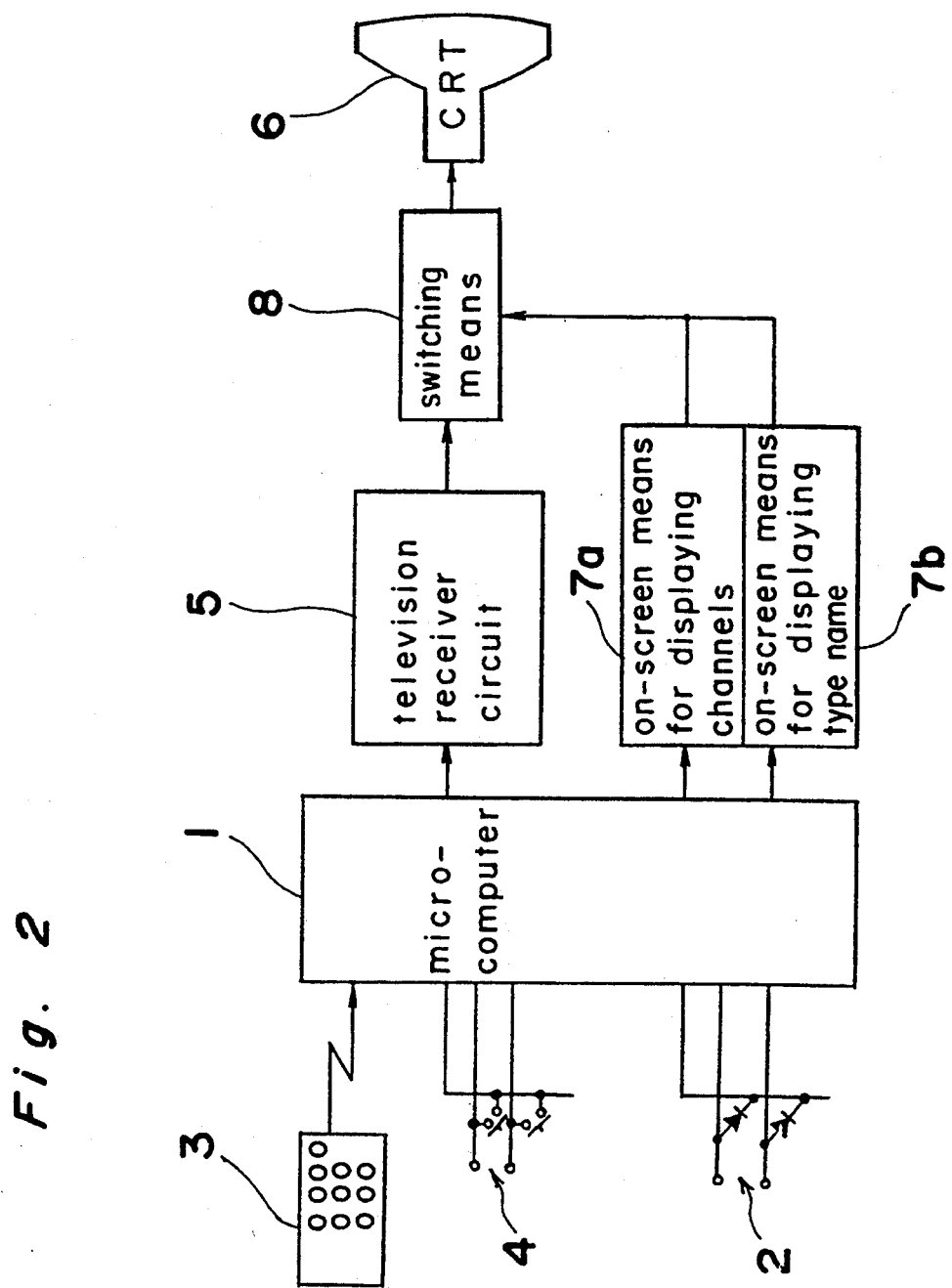
FIG. 2 is a block diagram of a television receiver in accordance with a first embodiment of the present embodiment.

FIG. 2 shows the construction of the television receiver of the present invention. A type switch setting portion 2, a remote control 3 for operating the television receiver, a keyboard 4 which works as in the above described remote control 3, and so on are provided respectively in the input portion of the microcomputer 1 for operating the respective functions of the television receiver as in the conventional embodiment. The on screen means 7a for channel display use is adapted to display the reception channel as before. The on screen means 7b for type displaying type name is to display on the screen face of the CRT6 the set contents of the type switch setting portion 2 when the inspecting person has instructed the check with the above described remote control 3 and the keyboard 4. A function of effecting the type switch setting operation is built in, by the above described type switch setting portion 2, within the microcomputer 1, so that the type name and so on of the television receiver being manufactured are displayed on the television screen face.

When the inspecting operation is effected at a step of manufacturing the television receivers in the present embodiment constructed as described hereinabove, the inspecting instructions are given from the remote control 3 and the keyboard 4, so that the set contents read from the type switch setting portion 2, which are the inputs of the microcomputer 1 are displayed on the television screen face by the on screen means 7b for displaying type name on the side of the television receiver which has detected the inspecting instructions. The judgment as to whether or not the type setting of the present television receiver is effected correctly is effected immediately by a look at the display on the screen face.

Figure 3:
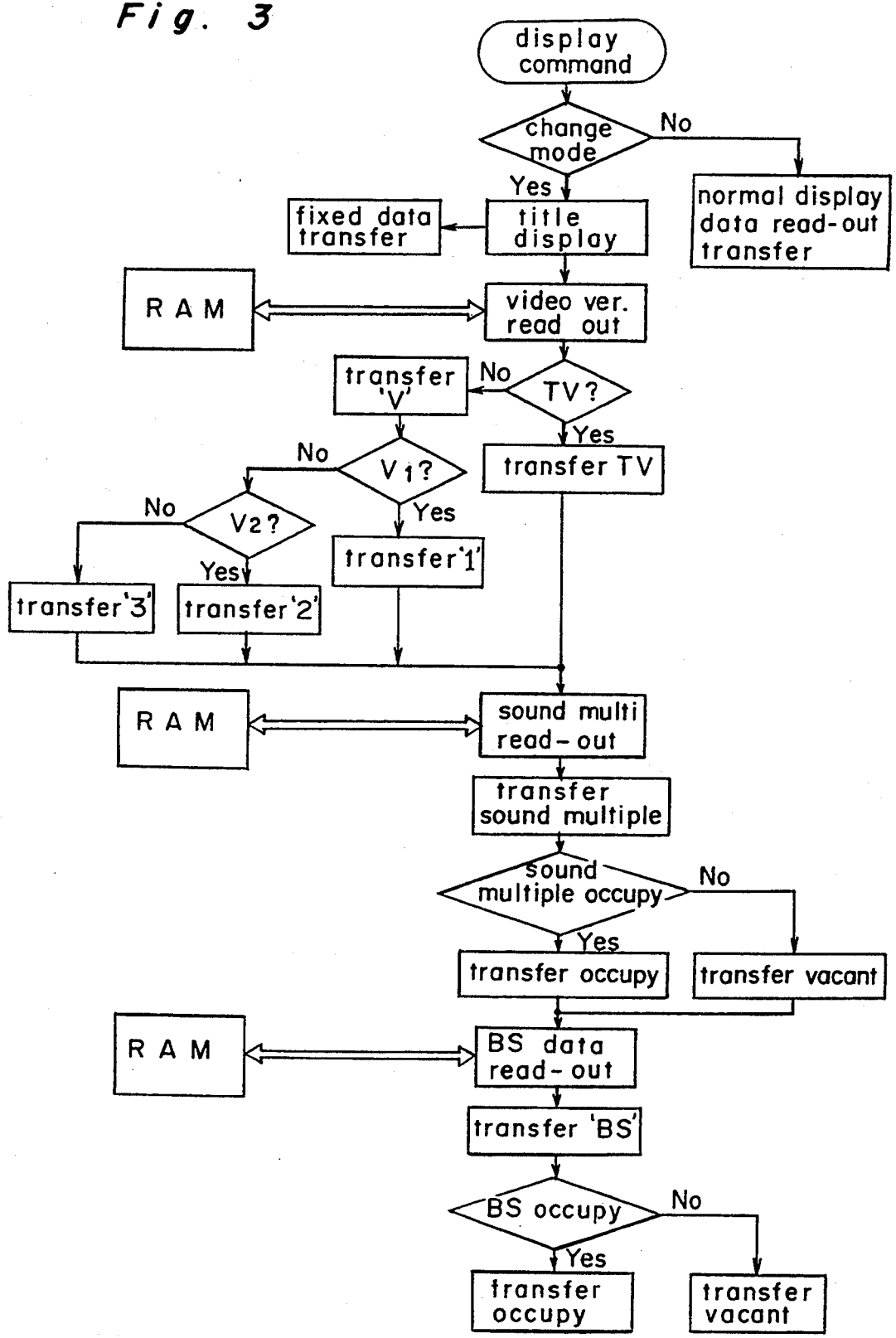
FIG. 3 is a flowchart showing the transferring operation of the type switch setting data onto an on screen displaying means.

FIG. 3 is a flowchart showing a means of transferring and inputting the set data in accordance with the title into the on screen memory (RAM) so as to effect the on screen display of the data set in the type. First, a determination is made as to whether or not the type has been switched with the on screen display instructions. In the case of yes, namely, when the type has been switched, the title displays, which are set on the type, such as voice multiplex functions, established stationary data built in within the BS are transferred into the on screen memory (RAM). Further, the video version established in the memory (RAM) of the microcomputer is read so as to check whether or not it is TV. If it is television, it is transferred into the on screen memory (RAM). Then, the voice multiplex data are read from the memory (RAM) of the microcomputer, and are transferred into the on screen memory (RAM). The existence/absence of the voice multiplex function is checked with respect to the "voice multiplex" data. If it is attached with the voice multiplex function, the "existence" is transferred into the on screen memory (RAM).

The BS data is read so as to check whether or not it is attached to a BS tuner. If it is attached to the BS, the "existence" is transferred, inputted.

Figure 4:
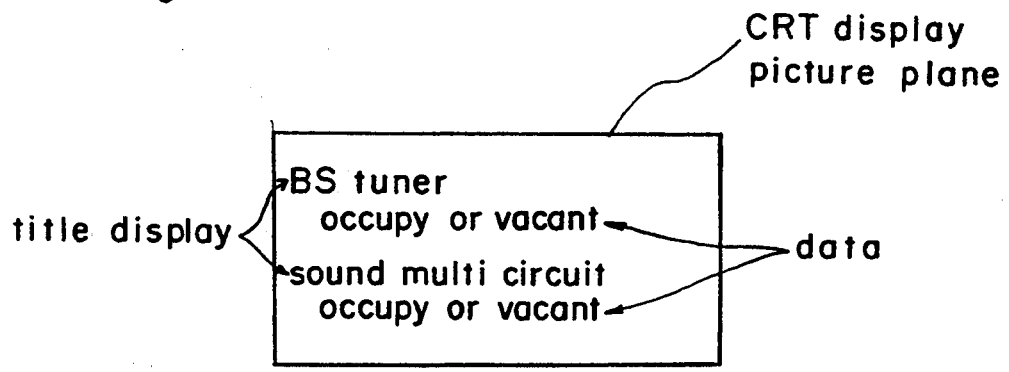
FIG. 4 is a plane view showing the screen display embodiment.

An example of the on screen display on the CRT screen face is shown in one embodiment in FIG. 4. In the case of the example, the voice multiplex built in type with the BS tuner attached may be confirmed at a glance.

Figure 5:
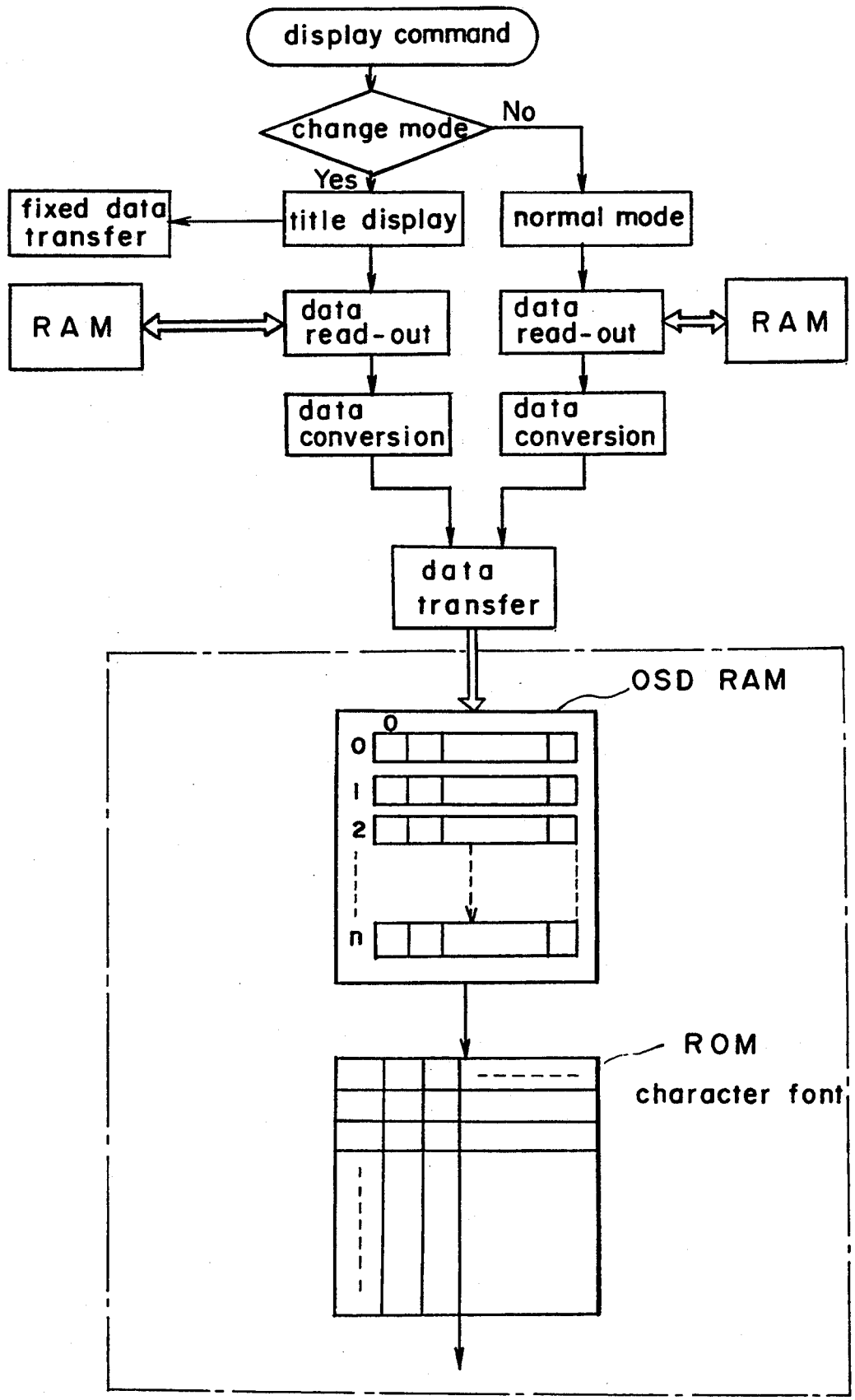
FIG. 5 is a flowchart showing the relationship between the transfer of the type switch setting data and the memory.

When it is not the type switching, the data reading.-transferring for effecting the on screen displaying operation is effected in the normal mode. FIG. 5 is a schematic block diagram showing the relationship of the relationship of the Yes/No in the switching operation.

In FIG. 5, the flowing of the reading.transferring of the data is approximately equal even in the case of the existence or the absence of the type switching. The transferred data are displayed on the on screen memory (RAM), and are inputted as numeral values corresponding to the address number of the letter font (ROM) in accordance with the display title.

Figure 6:
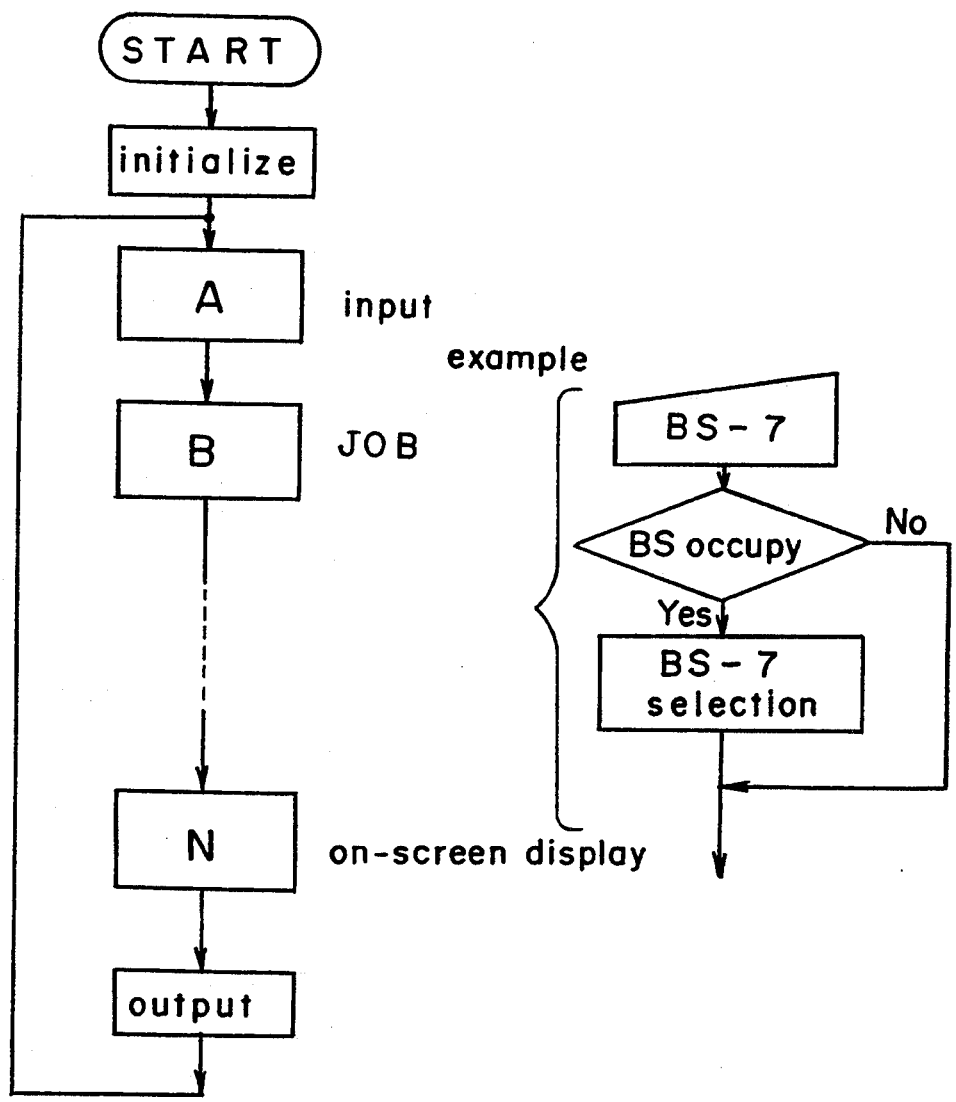
FIG. 6 is a flowchart of a microcomputer control.

FIG. 6 is a schematic block diagram showing the whole microcomputer control. For example, in the JOB, the actual control program is set. The existence/absence of the BS is decided with respect to the BS-7 station selection. If it is in "existence", the control operation such as station selecting control of the BS-7 or the like is effected.

In the present embodiment, the type name set at present as the type switching information is outputted as the on screen signal by the operation of the remote control 3 and the keyboard 4 so as to display it on the television screen face. But data such as numerals, type names corresponding to the respective types, instead of the type name, may be used.

As is clear from the foregoing description, according to the arrangement of the present invention, the type or the data corresponding to it is set into the type switch setting portion so as to specify into the microcomputer a function to be carried out. The receiving, driving operations are adapted to be effected with the use of the microcomputer. An on screen means for displaying on the television screen face the set contents of the above described type switch setting portion when the inspecting instructions have been detected is provided. When many types of television receivers are manufactured with one type of microcomputer, the type switch setting contents corresponding to the type may be easily known by the on screen means. The inspection errors may be reduced in the many types of television receivers, and the productivity may be improved by the reduction in the inspecting time.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A television receiver of a preselected type comprising:
   a microcomputer for controlling the operation of the television receiver, said microcomputer including means for controlling respective operations of a plurality of various kinds of television receivers, each receiver having different operations from the other receivers;
   a type switch setting portion connected to said microcomputer for entering and storing data instructing functions to be executed by said microcomputer, said data including and being in accordance with the preselected type of the television receiver such that said microcomputer controls the operation of only a television receiver of the preselected type;
   at least one of a remote control and a keyboard connected to said microcomputer for controlling the television receiver; and
   a on-screen means connected to said microcomputer for displaying on a television screen face said data entered and stored by said type switch setting portion in response to commands from one of said remote control and keyboard;
   wherein, in response to an examination instruction input to said microcomputer by one of said remote control and keyboard, said on-screen means displays selected portions of said data including said predetermined type of television receiver on said television screen face, such that an operator determines from the display whether or not the data entered by said type switch setting portion is correct for the predetermined type of television receiver.

* * * * *